UNITED STATES PATENT OFFICE.

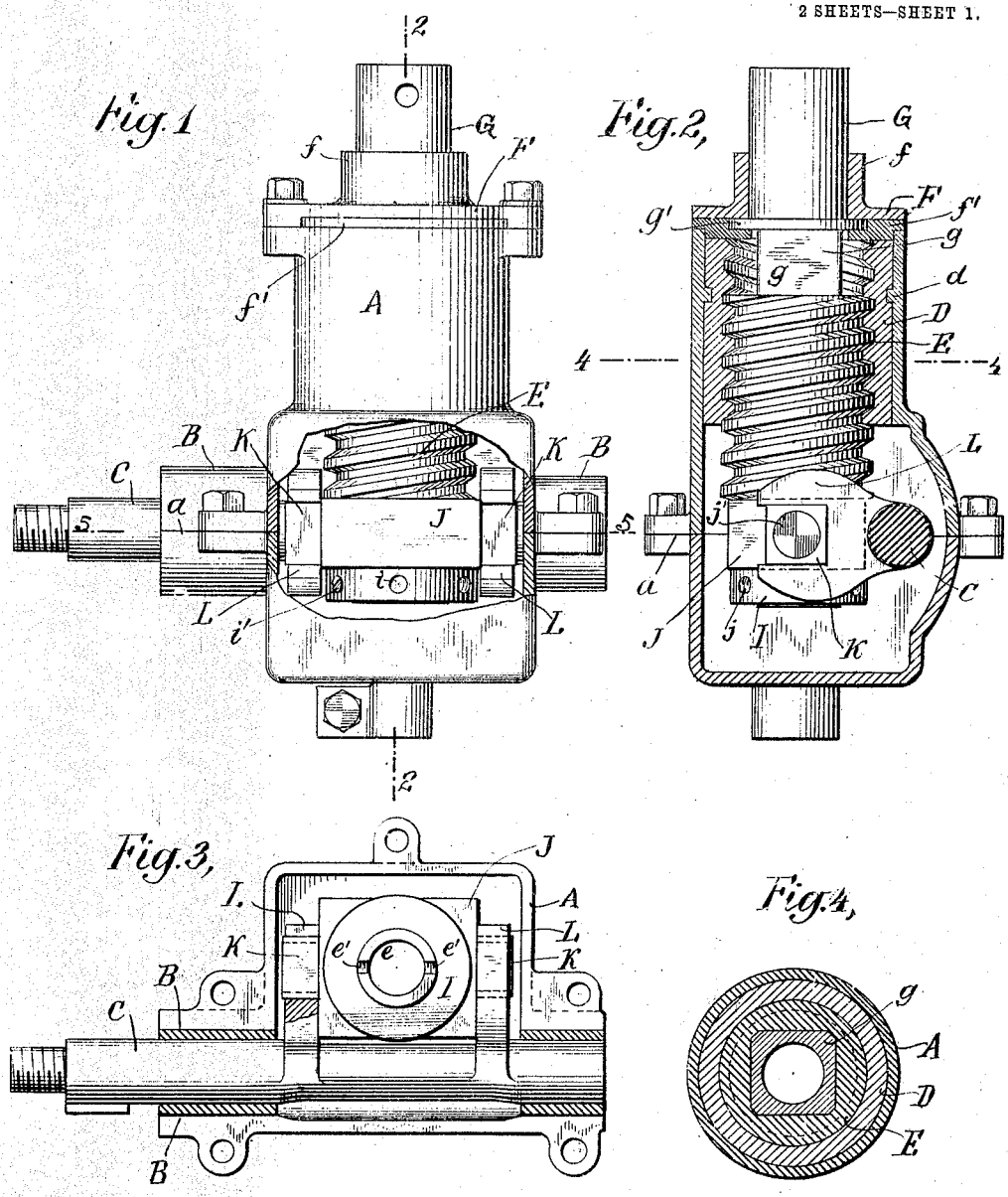

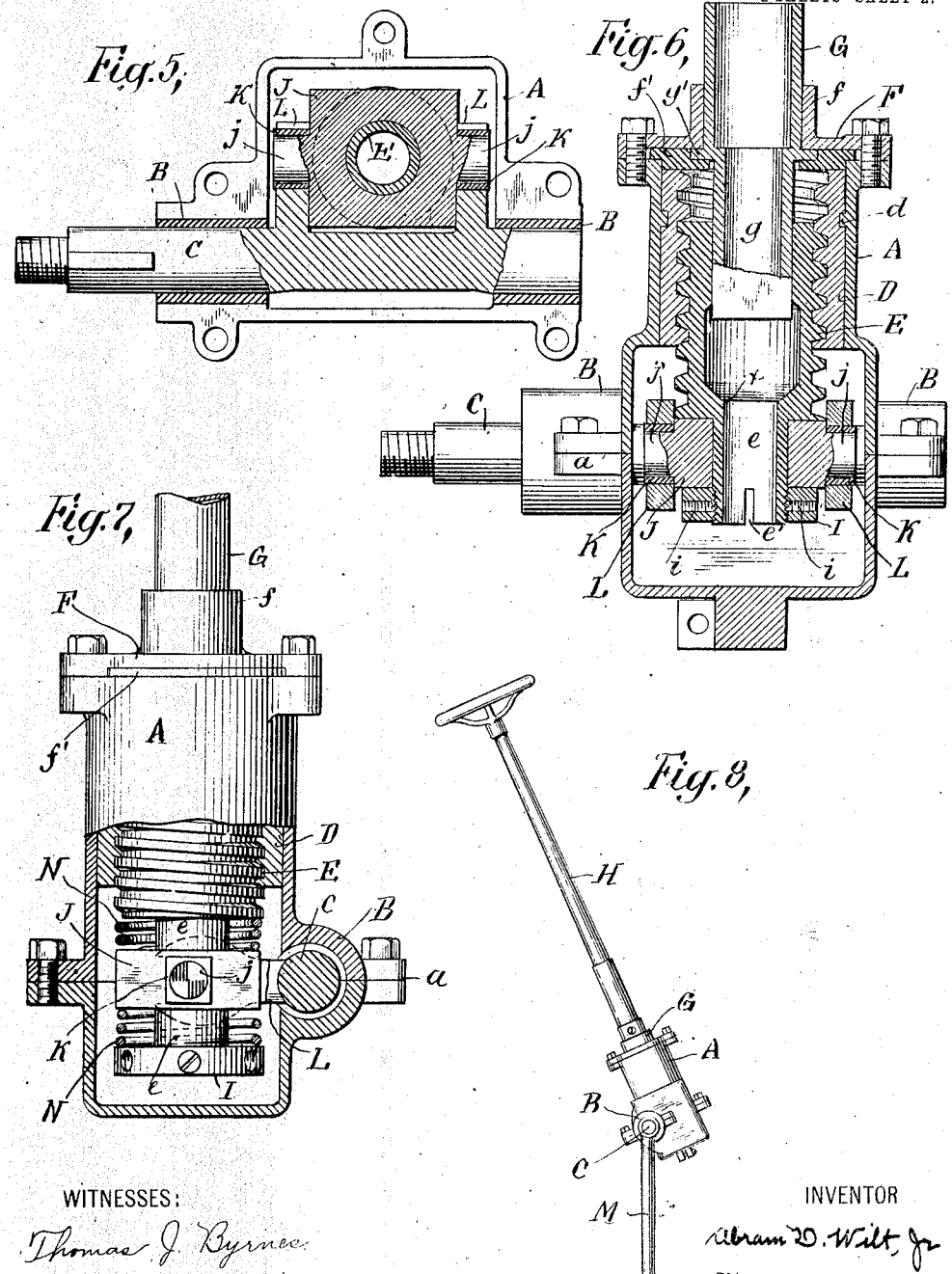

ABRAM D. WILT, JR., OF DETROIT, MICHIGAN.

STEERING-GEAR.

No. 923,230.     Specification of Letters Patent.     Patented June 1, 1909.

Application filed November 25, 1908. Serial No. 464,369.

*To all whom it may concern:*

Be it known that I, ABRAM D. WILT, Jr., a citizen of the United States, residing at Detroit, county of Wayne, and State of Michigan, have invented certain new and useful Improvements in Steering-Gears, of which the following is a full, clear, and exact description.

This invention pertains to steering gears for self-propelled vehicles, and relates more particularly to the general type of apparatus in which the rotation of the hand-wheel rotates a worm or screw and so produces an axial movement which actuates a rock-shaft through the instrumentality of an arm or arms mounted on the rock-shaft and embracing the axially movable member; the rock-shaft itself being connected with the steering wheels by suitable means, so that rotary movement of the shaft in one direction or the other will effect a corresponding movement of the steering wheels.

The chief object of the invention is to provide a steering gear of the kind referred to, which shall be simple and compact in construction, capable of being manufactured at low cost, and withal thoroughly effective and reliable in operation.

To this end the invention consists in the novel features of construction, arrangements of parts and combinations of elements hereinafter described, and more particularly set forth in the appended claims.

Referring now to the annexed drawings, in which the preferred embodiment is illustrated, Figure 1 is a side elevation, with part of the outer casing broken away to show internal parts. Fig. 2 is a section on line 2—2. Fig. 3 is a plan view of the bottom of the gear, with the lower portion of the casing removed. Fig. 4 is a section on the line 4—4 of Fig. 2. Fig. 5 is a section on the line 5—5 of Fig. 1. Fig. 6 is a central vertical section at right angles to the plane of Fig. 4. Fig. 7 is a part sectional view showing springs employed in the device, for taking up the vibration incident to the running of the vehicle. Fig. 8 is a side view of the complete device on a reduced scale, showing also the hand wheel by which the mechanism is actuated and the arm or crank through which the motion of the rock shaft is imparted to the steering wheels of the vehicle.

The external casing, which incloses the working parts of the device to protect the same from injury and exclude dust and dirt, is designated by A, and is preferably made in two parts, separable along the line $a$ and providing between them bearings B, B, for the rock-shaft C. In the upper part of the casing is an internally threaded sleeve or nut D, in which works a worm or screw E; said sleeve or nut being preferably formed by casting Babbitt or other suitable metal around the worm, which is temporarily supported in proper position by any suitable means, not shown. In order to retain the nut securely in position the casing is provided with one or more internal lugs $d$, which are of course embedded in the metal of the nut in the casting operation.

On the top of the casing is a cover-plate or cap F, having a neck or collar $f$ forming a bearing for a rotatable socket member G, provided with an extension $g$ reaching into the worm E, the construction of the parts being such as to cause the worm to rotate with the socket member and yet move axially on the extension $g$. A simple and convenient method for this purpose is to make the extension and interior of the worm square in cross section, as shown in Fig. 4. The purpose of the socket member G is to receive the hand wheel shaft H, Fig. 8, which may be fixed therein in any convenient and suitable manner. It will therefore be seen that rotation of the hand wheel will rotate the worm and hence cause the latter to move in or out of the stationary nut, according to the direction in which the hand wheel is turned. Axial displacement of the socket member is prevented by a flange $g'$ formed thereon, lying under the cap F and fitting a rabbet in an annular bearing plate $f'$ held firmly between the casing A and the cap just referred to.

The lower end of the worm is provided with a cylindrical stem $e$, and held thereon by means of a threaded annulus or nut I is a square block J, having alined trunnions $j$, $j'$, extending from opposite sides of said block, parallel with the rock-shaft C. By preference the stem $e$, which is in axial alinement with the worm, is hollow or tubular and at its inner end opens into an enlargement of the central bore indicated at $x$. Loosely mounted on the trunnions are two square blocks K, K, each slightly smaller than the thickness of the trunnion block J, as clearly shown in Figs. 1, 2 and 6. Closely embracing the trunnion block J are two arms or jaws L, L, integral with or rigidly secured to the rock shaft C, engaging the bearing blocks K, K.

To hold the nut or annulus I firmly in adjusted position it is provided with a plurality of radial apertures, $i$, threaded to receive a locking screw $i'$, while the stem $e$ is provided with one or more slots, as $e'$, into which said screw may project. Thus in adjusting the annulus the same is screwed up as far as desired, and is then turned backward or forward until one of the threaded apertures is in register with a slot in the stem; whereupon the screw $i'$ (Fig. 1) is inserted therein, to lock the parts securely together.

The method just described affords very close adjustment of the parts. For example, with two slots in the stem $e$, diametrically opposite each other, and an odd number of equidistant radial apertures $i$ in the annulus I, say five, a movement of the annulus equal to one-tenth of a revolution will bring a threaded aperture $i$ in register with one or the other of the slots in the stem; and if the stem is provided with say twenty threads to the inch such a movement of the annulus will produce an axial motion of one two-hundredth of an inch, thus providing an adjustment close enough for all practical purposes.

It will now be seen that as the worm is reciprocated by the hand wheel shaft the trunnion block in which the worm-stem $e$ is free to turn, will be moved past the shaft C, and, through the instrumentality of the bearing blocks K, K, and the jaws L, L, will rock the shaft. At the same time, turning or twisting of the trunnion block on the stem $e$ is prevented by the jaws, which, it will be remembered, closely embrace the block; long and firm bearing between the block and the jaws being afforded by reason of the fact that the bearing blocks are narrower than the trunnion block, so that the inner edges of the jaws overhang the top and bottom of the block, as clearly shown in Fig. 2.

On the end of the rock-shaft which protrudes from the casing, an arm or crank M may be secured, for connection with the usual links which operate the steering knuckles, not shown.

In the modification illustrated in Fig. 7 the stem $e$ is elongated, to permit the insertion of two coil springs, N, N, between the trunnion block and the annulus I on one side, and the worm E on the other. These springs permit sufficient play of the trunnion block up and down on the stem to absorb vibration and shocks transmitted from the steering wheels, and yet can be stiff enough to prevent obstructions in the roadway from turning the steering wheels. In other respects the construction illustrated in Fig. 7 is identical with that shown in the other figures.

The advantages of the device are numerous and important. Its general arrangement, and principle of construction and operation, are such that it may be made compact and durable. The stresses to which it may be subjected, and those incident to its operation, are well distributed, and efficiently resisted; mention being made particularly of the method, previously described, for preventing twisting or turning of the trunnion block. Lost motion between the trunnion block and the worm, due to wear or other causes, can be readily taken up by adjusting the nut or annulus I. Ready access to the working parts is afforded by removal of the lower part of the casing, after which the rock-shaft may be lifted out of its bearings, the jaws disengaged from the bearing blocks, and the latter slipped off of the trunnions. While in use, the working parts are completely protected by the casing, and the entrance of dirt, water, etc., prevented.

As previously stated, the device specifically described and illustrated herein is merely the preferred construction, and it will be apparent to those skilled in the art that the same may be varied as to the details of construction without departure from the proper scope and spirit of the invention as defined by the appended claims.

What I claim is:

1. In a steering gear, in combination, a rock shaft having outstanding jaws or arms, a trunnion block embraced by said arms to actuate the rock shaft, a worm or screw rotatably connected with the trunnion block, an internally threaded nut or sleeve in which the worm or screw works, an inclosing casing having bearings for the rock shaft and holding the nut in fixed position with respect to the worm or screw, and means for rotating the worm or screw but permitting axial movement thereof, as set forth.

2. In a steering gear, in combination, an inclosing casing having transversely arranged bearings, a rock shaft mounted in said bearings and provided with outstanding parallel arms or jaws, a trunnion block embraced by the arms, the contiguous faces of the arms and the block being in close parallelism to prevent rotation of the block, a worm rotatably connected with the trunnion block, an internally threaded nut or sleeve for the worm or screw, carried in fixed relation thereto by the inclosing casing, and means for rotating the worm or screw but permitting axial movement thereof, as set forth.

3. In a steering gear, in combination, an inclosing casing having transversely arranged bearings, said casing being made in separable sections with the plane of separation passing centrally through the said bearings, a rock shaft mounted in the bearings and provided with outstanding arms, a worm operatively connected with said arms to rock the shaft, an internally threaded nut or sleeve for the worm, fixed in the inclosing casing and carried thereby, and means for rotating the worm but permitting axial movement thereof, as set forth.

4. In a steering gear, in combination, a rock shaft, outstanding jaws or arms thereon, a trunnion block having trunnions engaging said arms, a worm bearing on the trunnion block and having a stem extending through the same, a nut threaded on the stem to hold the block thereon and take up wear on the block and the worm, and means for positively fastening the nut to the stem to prevent rotation of the nut after adjustment, as set forth.

5. In a steering gear, in combination, a rock shaft having outstanding parallel arms or jaws thereon, a trunnion block having trunnions engaging the arms, a worm bearing on the block and having a cylindrical stem extending through the block and having its end slotted, a nut threaded on the stem to hold the same thereon and take up wear on the block and the worm, said nut being provided with a series of threaded radially arranged apertures, and a screw fitting any of the said apertures and adapted to enter the slot in the stem to positively hold the nut against rotation in adjusted position, as set forth.

6. In a steering gear, in combination, an inclosing casing, a nut fixed therein, a worm working in the nut and having an axial bore of polygonal cross section, a rotatable member having an extension reaching into and conforming to the bore in the worm, whereby rotation of the said member will rotate the worm and permit axial movement thereof, a cap for the casing having a bearing for the said rotatable member, and means for preventing axial movement of said member, as set forth.

7. In a steering gear, in combination, a block provided with trunnions, a worm rotatably connected with the block, a fixed nut for the worm, a rock shaft having outstanding jaws or arms provided with openings slidably engaging the trunnions on said block, said openings being narrower than the thickness of the block whereby the edges of the openings overlie the edges of the block to present long bearing surfaces for preventing turning or twisting of the block, an inclosing casing for the whole, having bearings for the rock shaft, and means extending into the casing into engagement with the worm to rotate the latter but permit axial movement thereof relative to said means, as set forth.

8. In a steering gear, in combination, a worm or screw having an axially extending stem, a fixed nut in which said worm or screw works, a trunnion block slidable on said stem, a rock-shaft provided with arms or jaws embracing the trunnion block, a spring between the worm and the trunnion block, a stop on the end of the stem, and a spring between the trunnion block and said stop, as set forth.

9. In a steering gear of the kind described, a stationary nut, a worm or screw therein provided with an axially extending stem on one end and having an axial bore formed with an enlargement intermediate to its ends; said bore, between the said enlargement and the end opposite the stem, being polygonal in cross section to receive the correspondingly shaped end of a member for connecting the worm with the hand-wheel of the steering apparatus, whereby rotation of the hand wheel will cause the worm to move axially in its nut; substantially as shown and described.

In testimony whereof I affix my signature in the presence of two subscribing witnesses.

ABRAM D. WILT, Jr.

Witnesses:
R. Dale Benson, Jr.,
William E. Coale.